United States Patent
Robinson et al.

(10) Patent No.: US 8,856,531 B1
(45) Date of Patent: Oct. 7, 2014

(54) MESSAGE BUS KEY AGREEMENT SCHEME

(75) Inventors: Peter Alan Robinson, Enoggera Reservoir (AU); Kanchan Kaur, Upper Coomera (AU); Sean Parkinson, Indooroopilly (AU)

(73) Assignee: EMC Corporation, Hopkinton, MA (US)

( * ) Notice: Subject to any disclaimer, the term of this patent is extended or adjusted under 35 U.S.C. 154(b) by 415 days.

(21) Appl. No.: 13/169,179

(22) Filed: Jun. 27, 2011

(51) Int. Cl.
*H04L 9/30* (2006.01)

(52) U.S. Cl.
USPC .......... 713/173; 713/168; 713/169; 713/183; 380/28; 380/30; 380/44

(58) Field of Classification Search
USPC ......... 713/167, 168, 169, 170; 380/30, 44, 45
See application file for complete search history.

(56) References Cited

U.S. PATENT DOCUMENTS

| 5,854,759 | A | 12/1998 | Kaliski, Jr. et al. |
| 7,359,507 | B2 * | 4/2008 | Kaliski ............... 380/30 |
| 2003/0028773 | A1 * | 2/2003 | McGarvey et al. ....... 713/176 |

OTHER PUBLICATIONS http://www.diva-portal.org/smash/get/diva2:347875/FULLTEXT01.pdf "Realizing Distributed RSA using Secure Multiparty Computations"—Jul. 2009 NTNU*
http://ro.uow.edu.au/cgi/viewcontent.cgi?article=1175&context=infopapers "Multiparty Key Agreement Protocols"—University of Wollongong, May 2000.*
"Multi-Party Key Agreement with ECDH," RSA Share Project, Nov. 30, 2009, retrieved from https://community.emc.com/thread/94986 on May 25, 2011.

* cited by examiner

*Primary Examiner* — Randy Scott
(74) *Attorney, Agent, or Firm* — BainwoodHuang (57) ABSTRACT

Methods, computer program products, and systems are provided for using a single shared secured connection among all servers in a cluster by efficiently establishing and securely disseminating a shared key between the servers. In particular, this is done by using a Diffie-Hellman key agreement scheme among the servers using an ordered list of servers generated on-the-fly.

20 Claims, 3 Drawing Sheets

MESSAGE BUS KEY AGREEMENT SCHEME

BACKGROUND

A virtual appliance is a pre-installed, pre-configured operating system and software solution delivered inside a virtual machine (VM), running on a VM server machine. A VM "Snap Shot" is a copy of the state of a VM at a particular point in time. VM Snap Shots can be instantiated to create a new VM from the state when the VM Snap Shot was created. Multiple VMs can be created on the same physical server by starting multiple instances of the same VM Snap Shot. The VMs thus created would be clones of one another, starting out from the same state. The virtualizing operating system alters the clones slightly, assigning each a different IP address and other parameters to ensure the VMs can interoperate. In some environments, a large number of VMs run on a cluster of VM servers, connected by a network. In some virtualizing operating systems, resource schedulers exist which automatically detect the load on a VM server. If the load is too great, the resource scheduler can be configured to cause a new VM server to boot up to spread the load among a greater number of VM servers.

When a new VM server starts up, it should, without intervention, be able to automatically configure itself. It should also be able to detect other VM servers which it needs to communicate with, as well as other entities within the cluster.

In some systems, each VM server in the cluster has an encrypted transport layer security (TLS) connection to each other VM server within the cluster, forming a mesh of TLS connections. In some arrangements, the TLS connections utilize elliptic curve cryptography (ECC) for the encryption. Thus, when a new VM server is activated, it establishes a new mutually authenticated TLS connection with each server already operating within the cluster.

In other systems, each server in the cluster communicates with other servers via a central message bus. Each server in the cluster has a separate encrypted TLS connection to the message bus. Thus, when a new VM server is activated, it establishes a new mutually authenticated TLS connection with the message bus.

SUMMARY

The above described approaches suffer from deficiencies. In particular, in the meshed TLS connection approach, if there are N servers, $3(N^2-N)$ ECC scalar multiplications are required to establish, sign, and verify the full meshwork of mutually authenticated keys, which may be slow. Moreover, each VM server is required to maintain N separate encryption keys and messages sent to multiple servers must be encrypted several times. In the separate TLS central message bus approach, data needs to encrypted and re-encrypted at the message bus, which may be slow, and it allows the data to be temporarily unsecured within the message bus. In addition, in both approaches, data at the servers must either be locally stored in unencrypted form, or it must be re-encrypted prior to local storage, wasting processing resources through repetitive decryption/encryption.

In contrast to the above-described approaches, embodiments of the present disclosure are directed to techniques for using a single shared secured connection between all servers in the cluster by efficiently establishing and securely disseminating a shared key among the servers. In particular, this is done by using a Diffie-Hellman key agreement scheme among the servers using an ordered list of servers generated on-the-fly. This approach allows the servers in the cluster to securely communicate with each other with efficient setup and without necessitating re-encryption at a central message bus or for local storage.

In particular, in one embodiment, a method is provided for securely establishing an encryption key shared among members of a set of servers on a network, the set of servers including at least three servers. The method includes, at a first server of the set of servers, (a) computing a one-way function of a private key, a, uniquely associated with the first server, and a base element, Z, yielding a first public key, A, uniquely associated with the first server, as the result of this one-way function, (b) broadcasting a signal to the network, the signal requesting all servers of the set of servers, excluding the first server, to respond with identifying information, (c) receiving the identifying information from all servers of the set of servers, excluding the first server, (d) creating an ordered list of the identifying information of the set of servers, identifying information of the first server being at the beginning of the ordered list, (e) sending the ordered list and A to a second server of the set of servers, the second server being a server identified by the identifying information immediately following the first server's identifying information on the ordered list, (f) receiving, from a last server identified by the last identifying information on the ordered list, a set of one-way function results calculated by the last server based on information received from servers of the set of servers, (g) computing the one-way function of a and a last one-way function result of the received set of one-way function results, yielding a shared secret, and (h) deriving the encryption key from the shared secret. A system and computer program product for performing this method are also provided.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present disclosure are directed to techniques for using a single shared secured connection between all servers in the cluster by efficiently establishing and securely disseminating a shared key among the servers. In particular, this is done by using a Diffie-Hellman key agreement scheme among the servers using an ordered list of servers generated on-the-fly. This approach allows the servers in the cluster to securely communicate with each other with efficient setup and without necessitating re-encryption at a central message bus or for local storage.

Figure 1:
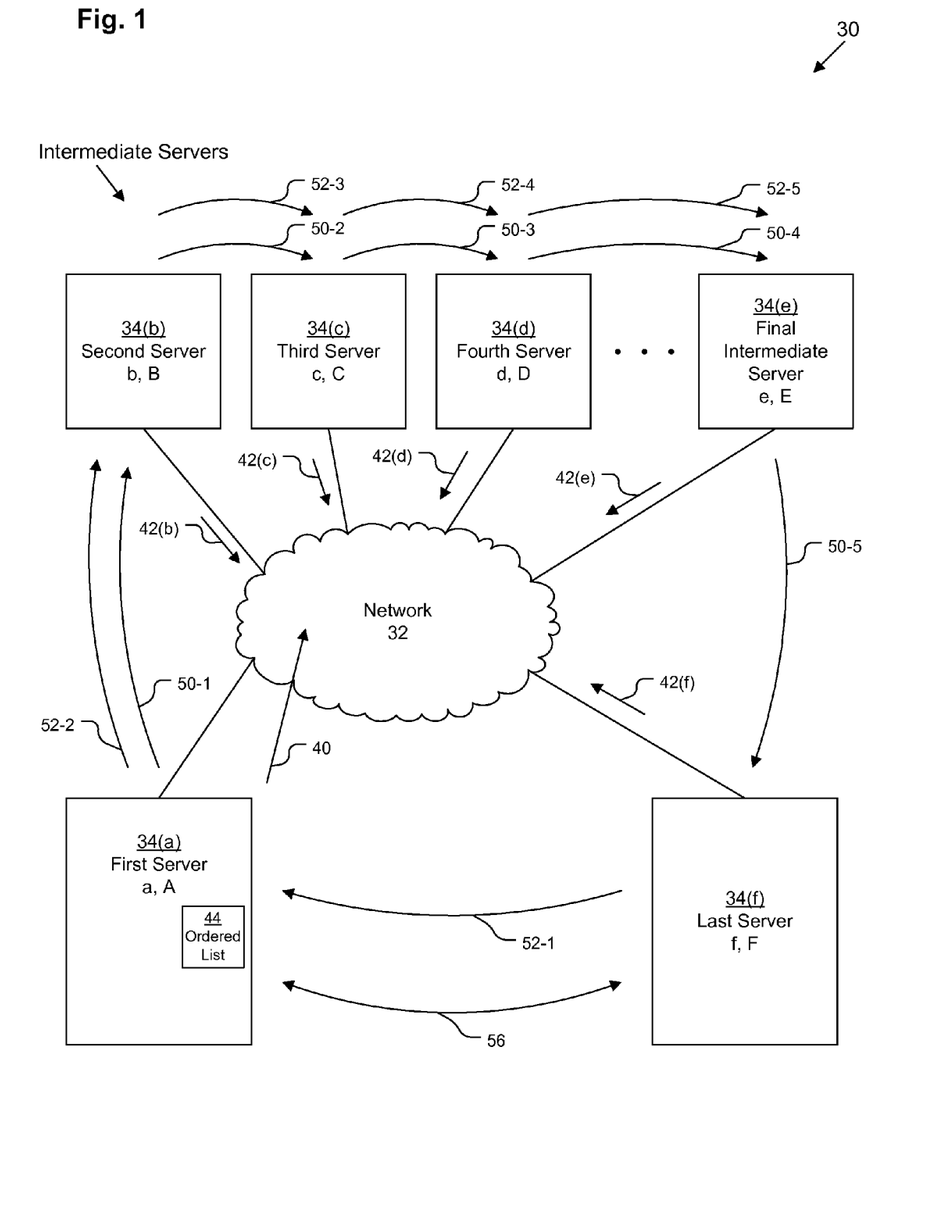
FIG. 1 illustrates an example system for use in practicing various embodiments.

FIG. 1 depicts an example system 30 for use in practicing various embodiments. System 30 may include a network 32, connected to a plurality of server machines 34, such as, for example, VM servers in a cluster arrangement. It should be understood that the servers 34 may be any sort of computerized devices, such as a computer, a mainframe, a terminal, a smart phone, etc.

It should also be understood that network 32 may be any sort of connection medium capable of connecting servers 34 such as a packet-switched network, a local area network, a wide area network, a storage area network, the Internet, a circuit-switched network, a fabric of interconnected cables and/or wires, a wireless network, a cellular network, or a point-to-point connection.

The system 30 is configured to utilize a multi-party key agreement scheme to allow servers 34 to agree on a shared encryption key for communication amongst them. In operation, servers 34 are configured to exchange messages in order to establish a shared secret and encryption key for use in cluster-wide secured communications. In particular, one server 34, depicted as first server 34(a) is configured to broadcast an invitation message 40 to the network 32 to begin the process of establishing the shared key. In response, the other servers 34(b-f) all send identifying information 42 back to the first server 34(a), which then assembles the identifying information into an ordered list 44 of identifying information about the servers 34. First server 34(a) then sends the ordered list 44 as well as various additional data for Diffie-Hellman key agreement in a first-round message 50-1 to a second server 34(b), as will be described in detail below. A series of first-round messages, depicted as 50-1 through 50-5, are sent in a circular arrangement between the servers 34 in the order from the ordered list 44. Once the final first-round message 50-5 is received by the last server 34(f), last server 34(f) sends a second-round message 52-1 to first server 34(a), as will be described in detail below. A series of additional second-round messages, depicted as 52-2 through 52-5, are sent between the first server 34(a) and the intermediate servers 34(b-e) in the order from the ordered list 44. Once this process, which will be described in further detail below, is completed, each server 34 has enough information to compute the shared encryption key, allowing for efficient and secured communications between the various servers 34. For example, any one of servers 34 may communicate with any other of the servers 34, such as first server 34(a) and last server 34(f), engaging in secured communications 56 across network 32 using the shared key.

Figure 2:
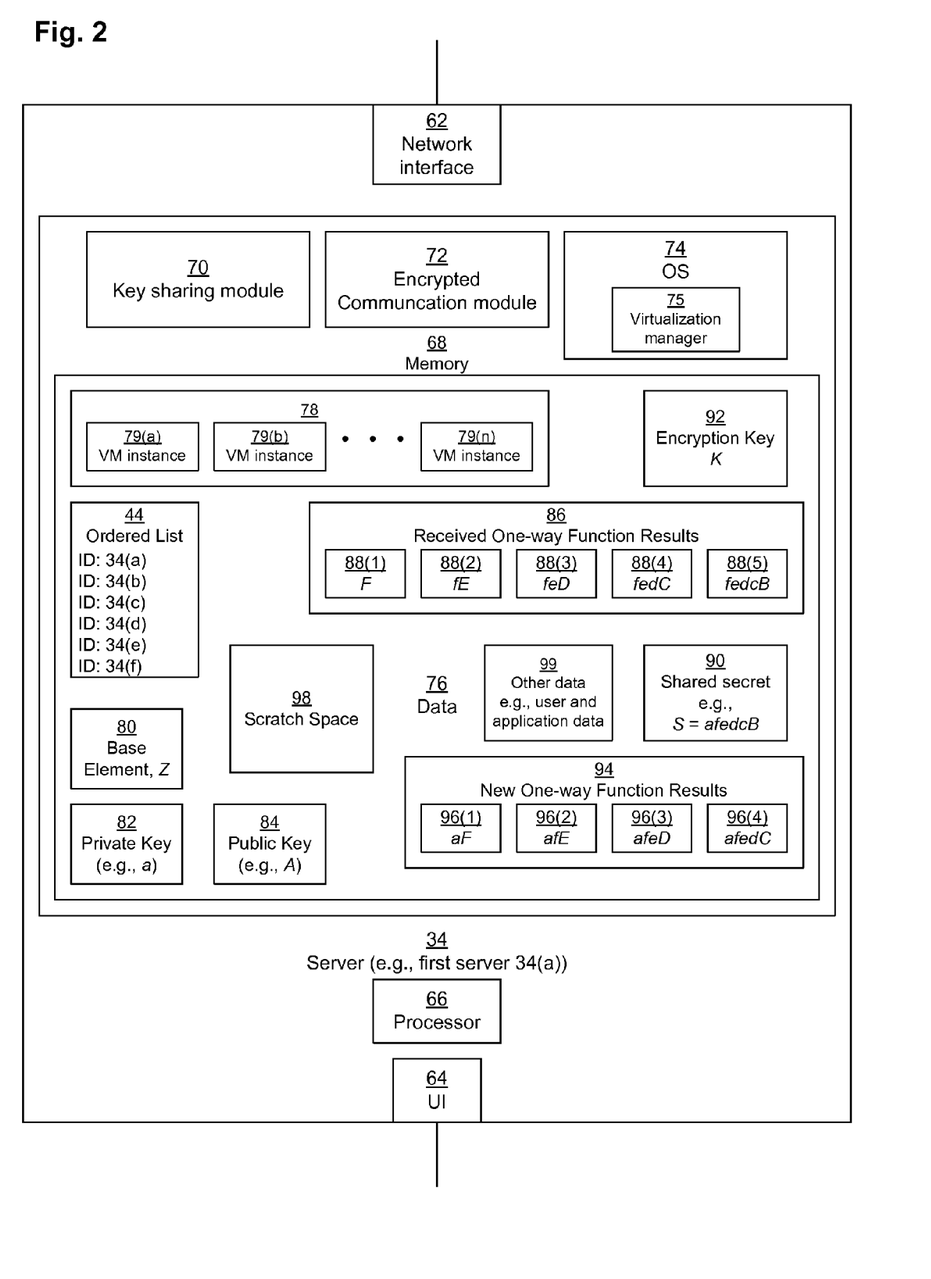
FIG. 2 illustrates an example apparatus according to various embodiments.

FIG. 2 depicts an example server 34 in further detail. All servers 34 have a similar design, but there may be some minor differences between them, particularly with respect to the data stored thereon. FIG. 2 is primarily directed towards first server 34(a), but differences will be pointed out in this Description between first server 34(a), last server 34(f), and the various intermediate servers 34(b-e).

As depicted, server 34 includes a network interface 62, a user interface 64, a controller/processor 66, and memory 68. Controller 66 may be a processor, a microprocessor, a central processing unit, an integrated circuit, a collection of integrated circuits, a set of processing circuitry, a field programmable gate array, a signal processor, similar elements, or some combination thereof.

In some embodiments, controller 66 is a general purpose processor configured to execute operations stored in software programs contained within memory 68. In connection with these embodiments, it should be understood that, within this document, any time a piece of software contained within memory 68 is described as performing a particular task or operation, that is mere shorthand for performance of the particular task or operation by the controller 66 executing code contained within that piece of software.

In other embodiments, controller 66 includes a set of processing circuitry that may be configured to perform operations directly in its hardware design as a pipeline of connected modules each having specifically-designed operations. In connection with these embodiments, it should be understood that, within this document, any time a piece of software contained within memory 68 is described as performing a particular task or operation, that is mere shorthand for performance of the particular task or operation by an appropriate circuitry module of the controller 66.

Network interface 62 is a hardware device that is configured to connect server 34 to network 34 so that communications can be carried out across the network 32. It should be understood that network interface 62 may have one or more connections to network 32 and that network interface 62 may connect to other networks in addition to network 32. Network interface 62, or, in some embodiments, an additional network interface, may also connect to other computerized devices, such as user terminals, personal computers, etc., for various purposes, such as, for example, remotely running a VM session or otherwise communicating with VM servers.

User interface 64 is an optional hardware interface that is configured to connect to various user interface devices (not depicted) that allow for communication between a human user and the server 34 by receiving user input and/or by providing information to the user. Examples of user interface devices that may connect to user interface 64 may include, for example, a display, a monitor, a television, a cathode ray tube, a liquid crystal display, a plasma display, a light-emitting diode display, a keyboard, a keypad, a mouse, a tracking pad, a tracking stick, a tracking ball, a touch screen, a biometric device, a joystick, a printer, a plotter, a projection screen, similar devices, or some combination thereof (not depicted).

Memory 68 may be any kind of digital memory, such as for example, system memory, cache memory, volatile memory, random access memory, read-only memory, static memory, programmable read-only memory, flash memory, magnetic disk-based storage, optical disk-based storage, a hard disk, a floppy disk, a compact disc, a digital versatile disc, a blu-ray disc, similar devices, or some combination thereof. Typically memory 68 will include high-speed volatile system memory for storage of executing programs and data as well as lower-speed non-volatile long-term storage for permanent storage of programs.

Memory 68 stores a key sharing module (KSM) 70, an encrypted communication module 72, and operating system (OS) 74 for execution by controller 66. In some embodiments, OS 74 is a virtualizing OS, having a virtualization manager module 75 for execution by controller 66.

Memory 68 also stores data area 76. Data area 76 includes a set 78 of VM instances 79 managed by virtualization manager 75, ordered list 44, a variety of key-sharing data 80-96 used by key sharing module 70, scratch space 98 for temporary use in performing calculations, and other data 99, including, for example, executing programs as well as user files and application data. The key-sharing data 80-96 used by key sharing module 70 will be described in further detail below, in connection with FIG. 3.

The first server 34(a) is configured to initiate a key agreement process to create a new key for a set of servers 34, typically, upon first booting up and joining a cluster.

Figure 3:
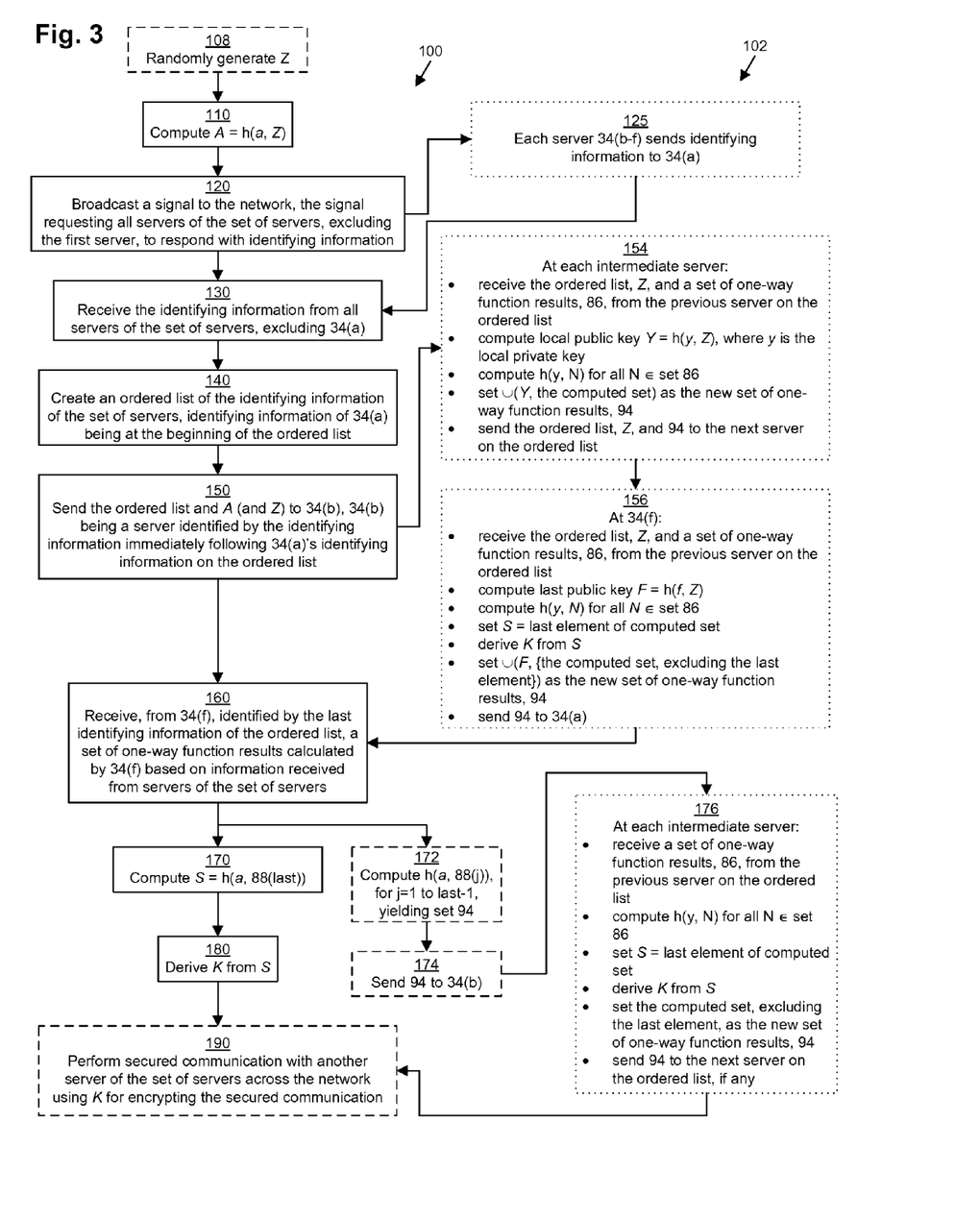
FIG. 3 illustrates an example method according to various embodiments.

FIG. 3 depicts a method 100 according to various embodiments. As depicted, method 100 is performed by first server 34(a). Ancillary method 102, also depicted in FIG. 3, includes various steps (depicted as boxes having dotted borders) associated with method 100 performed by the intermediate servers 34(b-e) and/or last server 34(f).

In optional preliminary step 108, KSM 70 of first server 34(a) randomly generates a base element, Z, and stores it as base element 80 within data area 76. In one embodiment, used throughout this Description as the primary example, the elliptic curve (EC) Diffie-Hellman (DH) key agreement scheme is used rather than a basic Diffie-Hellman key agreement scheme. Thus, in one embodiment, step 108 includes choosing a random base point located on a specific EC. Typically, a pre-selected EC will be used.

ECs in common use are standardized by organizations such as the National Institute of Standards and Technology (NIST) and American National Standards Institute (ANSI). These standardized curves are given names and are referred to as named curves. Despite being called named curves, they actually define an elliptic curve group. An elliptic curve group is defined by an operation that can be applied to points on an elliptic curve, referred to as point addition, together with a set of points on the curve. This set of points is defined such that, given a point on the elliptic curve (i.e., a generator point), all points in the set can be obtained by successive application of the point addition operation to the base point. The elliptic curve group includes the point at infinity which is the additive identity of the group. The number of points in the elliptic curve group is called the order. An example named curve is P256, which is defined in NIST's Digital Signature Standard issued on Jan. 27, 2000 as FIPS 186-2, the contents and teachings of which are hereby incorporated by reference in their entirety. Other examples of named curves include B283, K283, B409, K409, P384, B571, K571, and P521. EC cryptography (ECC) scalar multiplication is the multiplication of a point on the elliptic curve by a scalar according to well-known procedures.

Returning back to optional step 108, an example pre-selected EC might be, for example, P384. Any random point on the specific EC can be chosen as the base point, Z.

It should be understood that, in some embodiments, step 108 is not performed on-the-fly. Rather, in some embodiments, base point, Z, may be pre-selected according to the same criteria.

In step 110, KSM 70 of first server 34(a) computes a one-way function h(p, Q) of a private key, a, (stored as private key 82 in data area 76) uniquely associated with the first server 34(a), and Z yielding a first public key, A, to be stored as public key 84 in data area 76, public key A being uniquely associated with the first server 34(a), as the result of this one-way function. Step 110, although depicted as being performed prior to the next step 120, in some embodiments, actually may be performed in parallel or subsequent to that step. In any case, step 110 is performed prior to step 150.

It should be understood that in the EC DH embodiment, one-way function h(p, Q) represents ECC scalar multiplication of scalar value p with point Q on an EC, typically depicted as p×Q, or pQ for short. If P384 is being used, private key 82 is then typically a 384-bit integer. It should be understood that, although ECC scalar multiplication has not been proven to be a strict one-way function, it is typically assumed in the field of cryptography that it is, and that assumption will be made for the purposes of this Description, there being no known general solution to the EC discrete logarithm problem.

Therefore, in the EC DH embodiment, in step 110, KSM 70 of first server 34(a) computes A=a×Q, storing the calculated public key A as public key 84 in data area 76.

It should be understood that in servers 34 other than first server 34(a), private key 82 and public key 84 in data area 76 do not store private key a and public key A, respectively, but rather, they store a local private and a local public key. For example, last server 34(f) stores a last private key f as private key 82 in data area 76 and a last public key F (computed as f×Z) as public key 84 in data area 76. Last private key f and last public key F are uniquely associated with last server 34(f). While last private key f is kept a secret from the other servers 34 and other external entities, public key F is not a secret, and, in fact, as will be seen later, it is shared with first server 34(a). The various intermediate servers 34(b-e) also each locally store a unique local private key 82 and local public key 84, keeping the local private key 82 secret, and sharing the local public key 84 with the next server on ordered list 44, as will be described in further detail below.

In step 120, KSM 70 of first server 34(a) broadcasts a signal 40 to the network, the signal 40 requesting all servers 34(b-f) (excluding the first server 34(a)) to respond with identifying information. In one embodiment, first server 34(a) will be a new VM server joining a cluster. Upon first booting up and joining the cluster, KSM 70 of first server 34(a) initiates step 120 to initiate a new key agreement process to create a new key for the cluster.

In step 125, KSM 70 of each of the remaining servers 34(b-f) sends identifying information to the first server 34(a) within response messages 42(b-f). Each response message 42 includes information such as the network address (e.g., an IP address or a MAC address) of the server 34 that send that response message 42. Other identifying information may also be included, such as a server name, etc.

In step 130, KSM 70 of first server 34(a) receives the response messages 42 from all the servers remaining servers 34(b-f). Typically, upon receiving each response message, it is time-stamped with a time of receipt or a time of sending.

In step 140, KSM 70 of first server 34(a) creates ordered list 44 on-the-fly and stores it in data area 76. The ordered list includes identifying information (e.g., IP address) from each of the servers 34(a-f) in order. The identifying information of first server 34(a) is listed first, followed by the identifying information of the remaining servers 34(b-f) in some order. In one embodiment, KSM 70 of first server 34(a) orders the identifying information of the remaining servers 34(b-f) within ordered list 44 based on the timestamps of receipt time. In another embodiment, KSM 70 of first server 34(a) orders the identifying information of the remaining servers 34(b-f) within ordered list 44 based on the timestamps of sending time. In yet another embodiment, KSM 70 of first server 34(a) orders the identifying information of the remaining servers 34(b-f) within ordered list 44 in a random order. In any case, for the purposes of this Description, it is assumed that the order of the identifying information of the servers 34 in the ordered list is in the alphabetical arrangement depicted (i.e., 34(a), 34(b), 34(c), 34(d), 34(e), 34(f)). In order to ensure that all of the remaining servers 34(b-f) have had a chance to respond to the broadcast signal 40 of step 120, a set period of time (e.g., 10 seconds) after sending the signal 40 in step 120, KSM 70 of first server 34(a) assumes that all of the other servers 34(b-f) have had a chance to respond and it stores the ordered list 44 in data area 76 and proceeds to step 150.

In step 150, KSM 70 of first server 34(a) sends first-round message 50-1 to second server 34(b), as indicated by the second line of the ordered list 44. First-round message 50-1 includes the ordered list 44 and the first public key A. In embodiments in which base point Z has been generated on-the-fly in step 108, base point Z is also included within first-round message 50-1. In embodiments in which base point Z is pre-selected, base point Z may be omitted from first-round message 50-1 as well as all other first-round messages 50 if all servers 34 are pre-configured with the value of base point Z stored as base point 80 within their respective data areas 76.

In step 154, KSM 70 of each intermediate server 34(*b-e*) receives and transmits a first-round message 50 in a circular arrangement indicated by ordered list 44. Thus, in the arrangement depicted in FIG. 1, KSM 70 of second server 34(*a*) receives first-round message 50-1 from first server 34(*a*), stores various values, performs various calculations, and then sends first-round message 50-2 to third server 34(*c*). KSM 70 of third server 34(*c*) similarly receives first-round message 50-2 from second server 34(*b*), stores various values, performs various calculations, and then sends first-round message 50-3 to fourth server 34(*d*). Eventually, KSM 70 of final intermediate server 34(*e*) receives first-round message 50-4, stores various values, performs various calculations, and then sends first-round message 50-5 to last server 34(*e*). The contents of the various first-round messages 50 according to the example of FIG. 1 are shown in the first five data rows of Table 1. Each first-round message 50 includes the ordered list 44, (optionally) base point Z, and a set of one-way function results.

TABLE 1

Contents of the messages 50, 52 sent in the key agreement phase in the example system 30 of FIG. 1

| | | Message Contents | | | | | |
|---|---|---|---|---|---|---|---|
| | Between | Preliminary | | Set of one-way function results | | | |
| Message | servers | information | | Public Key | Intermediate results | | |
| 50-1 | 34(a)→34(b) | Ordered List | Z | A = aZ | | | |
| 50-2 | 34(b)→34(c) | Ordered List | Z | B = bZ | bA | | |
| 50-3 | 34(c)→34(d) | Ordered List | Z | C = cZ | cB | cbA | |
| 50-4 | 34(d)→34(e) | Ordered List | Z | D = dZ | dC | dcB | dcbA |
| 50-5 | 34(e)→34(f) | Ordered List | Z | E = eZ | eD | edC | edcB | edcbA |
| 52-1 | 34(f)→34(a) | | | F = fZ | fE | feD | fedC | fedcB |
| 52-2 | 34(a)→34(b) | | | | aF | afE | afeD | afedC |
| 52-3 | 34(b)→34(c) | | | | | baF | bafE | bafeD |
| 52-4 | 34(c)→34(d) | | | | | | cbaF | cbafE |
| 52-5 | 34(d)→34(e) | | | | | | | dcbaF |

In detail, when KSM 70 of any intermediate server 34(*b-e*) receives a first-round message 50, KSM 70 of that intermediate server 34(*b-e*) stores the ordered list 44 in data area 76, stores base point Z 80 in data area 76 (if applicable), and stores the received set of one way function results 86 in data area 76. KSM 70 of that intermediate server 34(*b-e*) also computes local public key 84 by applying the one-way function (e.g., ECC scalar multiplication) to the local private key 82 and the received base element Z 80 (e.g., for second server 34(*b*), local public key B=b×Z, where b is the local private key 82). The local private key 82 is also ECC scalar multiplied by all elements 88 of the received set of one-way function results 86 to create a set of intermediate one-way function results, which are then combined with the local public key 84 to form a set of new one-way function results 94 which may then be included within the first-round message 50 sent to the next server 34(*b-f*), as indicated by the ordered list 44, together with the ordered list 44 and, optionally, the base point Z.

In step 156, KSM 70 of final server 34(*f*) receives final first-round message 50-5 from final intermediate server 34(*e*), stores various values, performs various calculations, and then sends second-round message 52-1 to first server 34(*a*), based on the first line of the ordered list 44. The contents of second-round message 52-1 according to the example of FIG. 1 are shown in the sixth data row of Table 1. Second-round messages 52 differ from first-round messages 50 in that they no longer contain the ordered list 44 and the base point Z, and the set of one-way function results contained contains the results of scalar multiplication of the local private key 82 with all elements 88 of the received one-way function results 86 except for the last element.

In detail, when KSM 70 of last server 34(*f*) receives first-round message 50-5, KSM 70 of the last server 34(*f*) stores the ordered list 44 in data area 76, stores base point Z 80 in data area 76 (if applicable), and stores the received set of one way function results 86 in data area 76. The KSM 70 of the last server 34(*f*) also computes local public key 84 by applying the one-way function (e.g., ECC scalar multiplication) to the local private key, f, 82 and the received base element Z 80 (e.g., local public key F=f×Z). The local private key 82 is also ECC scalar multiplied by all elements 88 of the received set of one-way function results 86 except for the last element 88 (e.g., edcbA) of that set 86 to create a set of intermediate one-way function results, which are then combined with the local public key, F, 84 to form a set of new one-way function results 94 which may then be included within the second-round message 52-1 sent to the first server 34(*a*), as indicated by the ordered list 44, together with the ordered list 44 and, optionally, the base point Z. The excluded last element 88 (e.g., edcbA) of the received set of one-way function results 86 is ECC scalar multiplied by the private key, f, 82 and stored as shared secret, S, 90 (e.g., S=fedcbA). KSM 70 of last server 34(*f*) derives and stores encryption key, K, 92 from shared secret S. In some embodiments, this derivation is performed by taking a particular coordinate value from the EC point S, while in other embodiments, a more complicated transformation is applied to S.

In step 160, KSM 70 of first server 34(*a*) receives second-round message 52-1 from last server 34(*f*) and stores various values in data area 76. In detail, when KSM 70 of first server 34(*a*) receives second-round message 52-1, KSM 70 of the first server 34(*a*) stores the received set of one way function results 86 in data area 76. As depicted in FIG. 3, the example received set of one way function results 86 includes elements 88(1-5), or (F, fE, feD, fedC, fedcB). It should be understood that the specific elements 88 illustrated in FIG. 3 specifically represent the elements stored in first server 34(*a*) in step 160 in the example of FIG. 1 and not the elements stored within the received set of one way function results 86 of any of the other servers 34(*b*-*f*).

In step 170, KSM 70 of first server 34(*a*) computes and stored shared secret, S, 90 by applying the one-way function to the first private key, a, 82 and the last element 88(5) of the received set of one way function results 86 (e.g., S=afedcB). It should be noted that last element 88(5) is equal to the private keys of each of the servers, excluding the first server 34(*a*), ECC scalar multiplied by the base point Q, and that the shared secret 90 is equal to the shared secret 90 calculated by the last server 34(*f*) in step 156, since, mathematically, fedcbA=(fedcb)×aQ=(afedcb)×Q=(afedc)×bQ=afedcB for ECC scalar multiplication.

In step 180, KSM 70 of first server 34(*a*) derives and stores encryption key, K, 92 from shared secret S in the same manner as was done by last server 34(*f*), as described above in connection with step 156.

In step 172 (which is labeled as optional because first server 34(*a*) is able to determine shared secret S and encryption key K—which it can already use to communicate with last server 34(*f*) at this point—prior to performing step 172), KSM 70 of the first server 34(*a*) calculates and stores a set of new one-way function results 94 by applying the one-way function to the first private key, a, 82 and the elements 88(1-4) of the received set of one way function results 86, excluding the last element 88(5), storing the results as elements 96(1-4), or (aF, afE, afeD, afedC). It should be understood that the specific elements 96 illustrated in FIG. 3 specifically represent the elements stored in first server 34(*a*) in step 172 in the example of FIG. 1 and not the elements stored within the new set of one way function results 94 of any of the other servers 34(*b*-*f*). Step 172 may be performed in parallel with steps 170 and 180, or before or after those steps.

In step 174, the KSM 70 of the first server 34(*a*) sends the second-round message 52-2 to the second server 34(*b*), as indicated by the ordered list 44. The contents of second-round message 52-2 according to the example of FIG. 1 are shown in the seventh data row of Table 1.

In step 176, KSM 70 of each intermediate server 34(*b*-*e*) receives and (except in the case of final intermediate server 34(*e*)) transmits a second-round message 52 in the circular arrangement indicated by ordered list 44. Thus, in the arrangement depicted in FIG. 1, KSM 70 of second server 34(*a*) receives second-round message 52-2 from first server 34(*a*), stores various values, performs various calculations, and then sends second-round message 52-3 to third server 34(*c*). KSM 70 of third server 34(*c*) similarly receives second-round message 52-3 from second server 34(*b*), stores various values, performs various calculations, and then sends second-round message 52-4 to fourth server 34(*d*). Eventually, KSM 70 of final intermediate server 34(*e*) receives second-round message 52-5, stores various values and performs various calculations. The contents of the various second-round messages 52 according to the example of FIG. 1 are shown in the last five data rows of Table 1. Each second-round message 52 includes a set of one-way function results.

In detail, when KSM 70 of any intermediate server 34(*b*-*e*) receives a second-round message 52, KSM 70 of that intermediate server 34(*b*-*e*) stores the received set of one way function results 86 in data area 76. In some embodiments, the previously-stored received set of one way function results 86 (from step 154) may be deleted at this point. The local private key 82 is then ECC scalar multiplied by all elements 88 (e.g., in the case of second server 34(*b*), {aF, afE, afeD}) of the received set of one-way function results 86 except for the last element 88 (e.g., in the case of second server 34(*b*), afedC) of that set 86 to create a set of new one-way function results 94 which may then be included within the second-round message 52 sent to the next intermediate server 34(*b*-*e*), if any, as indicated by the ordered list 44. In some embodiments, the previously-stored set of new one-way function results 94 (from step 154) may be deleted at this point. In the case of the final intermediate server 34(*e*), since there are no more intermediate servers remaining on the ordered list 44, execution stops without ever sending out a second-round message 52. In any case, the excluded last element 88 (e.g., in the case of second server 34(*b*), afedC) of the received set of one-way function results 86 is ECC scalar multiplied by the local private key, 82 and stored as shared secret, S, 90 (e.g., in the case of second server 34(*b*), S=bafedC). KSM 70 of each intermediate server 34(*b*-*e*) also derives and stores encryption key, K, 92 from shared secret S in the same manner as was done by last server 34(*f*), as described above in connection with step 156.

At this point, after execution of steps 176 and 180 has completed, the key agreement has been completed, and all servers 34 are in possession of shared secret S and encryption key K. Thus, encrypted communication module 72 of first server 34(*a*) is able to, in optional step 190, perform secured communication with another server 34(*b*-*f*) of the set of servers across network 32 using encryption key, K, 92. Similarly, any two servers 34 are able to perform secured communication with each other across network 32 using encryption key, K.

While various embodiments of the invention have been particularly shown and described, it will be understood by those skilled in the art that various changes in form and details may be made therein without departing from the spirit and scope of the invention as defined by the appended claims.

It should be understood that, although six servers 34(*a*-*f*) are depicted in FIG. 1, and although four intermediate servers 34(*b*-*e*) are depicted in FIG. 1, this is by way of example only. In fact, any number greater than two of servers 34 is suitable for use in various embodiments. As used in this Description, the character 34(*a*) always refers to the first server, and the character 34(*f*) always refers to the last server, while any positive integer number of intermediate servers 34(*b*-*e*) is suitable.

Furthermore, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, it should be understood that all embodiments which have been described may be combined in all possible combinations with each other, except to the extent that such combinations have been explicitly excluded.

Finally, nothing in this Specification shall be construed as an admission of any sort. Even if a technique, method, apparatus, or other concept is specifically labeled as "prior art," "background," or "conventional," Applicants make no admission that such technique, method, apparatus, or other concept is actually prior art under 35 U.S.C. §102, such determination being a legal determination that depends upon many factors, not all of which are known to Applicants at this time. For example, Applicants make no admission that any technique, method, apparatus, or other concept labeled as "prior art," "background," or "conventional," is not the work of the same inventive entity under 35 U.S.C. §102(a). As an additional example, Applicants make no admission that any technique, method, apparatus, or other concept labeled as "prior art," "background," or "conventional," was patented or described in a printed publication in this or a foreign country or in public use or on sale in this country more than one year prior to the filing date of this Application under 35 U.S.C. §102(b). As an additional example, Applicants make no admission that any technique, method, apparatus, or other concept labeled as "prior art," "background," or "conventional," was not owned by the same person or subject to an obligation of assignment to the same person as embodiments of the present Application at the time the embodiments were made under 35 U.S.C. §103(c).

What is claimed is:

1. A method of securely establishing an encryption key shared among members of a set of servers on a network, the set of servers including at least three servers, the method comprising, at a first server of the set of servers:
   computing a one-way function of a private key, a, uniquely associated with the first server, and a base element, Z, yielding a first public key, A, uniquely associated with the first server, as the result of this one-way function computation;
   broadcasting a signal to the network, the signal requesting all servers of the set of servers, excluding the first server, to respond with identifying information;
   receiving the identifying information from all servers of the set of servers, excluding the first server;
   creating an ordered list of the identifying information of the set of servers, identifying information of the first server being at the beginning of the ordered list;
   sending the ordered list and A to a second server of the set of servers, the second server being a server identified by the identifying information immediately following the first server's identifying information on the ordered list;
   receiving, from a last server identified by the last identifying information of the ordered list, a set of one-way function results calculated by the last server based on information received from servers of the set of servers;
   computing the one-way function of a and a last one-way function result of the received set of one-way function results, yielding a shared secret; and
   deriving the encryption key from the shared secret.

2. The method of claim 1 wherein:
   the set of one-way function results includes:
      a last public key, F, uniquely associated with the last server, F having been computed by the last server by applying the one-way function to a last private key, f, uniquely associated with the last server, and Z; and
      a set of intermediate one-way function results calculated by the last server based on information received from servers of the set of servers, excluding the first server and the last server; and
   the method further comprises:
      computing the one-way function of a and F as well as each of the intermediate one-way function results, excluding the last one-way function result, yielding a set of new one-way function results;
      sending the set of new one-way function results to the second server; and
      performing secured communication with another server of the set of servers across the network using the encryption key for encrypting the secured communication.

3. The method of claim 2 wherein:
   the one-way function is the elliptic curve (EC) scalar product of a scalar value and a point on a specific EC;
   the private keys, a and f, are scalar values;
   Z is a base point on the specific EC; and
   the public keys, A and F, are points on the specific EC.

4. The method of claim 3 wherein the last one-way function result is the EC scalar product of the product of a private key of each of the servers of the set of servers, excluding the first server and the last server, multiplied together and Z.

5. The method of claim 4 wherein the method further includes, at an intermediate server of the set of servers, the intermediate server being distinct from the first server and the last server:
   in response to receiving the broadcast signal from the first server, sending the identifying information of that intermediate server to the first server;
   receiving the ordered list and a first set of previous one-way function results from a previous server identified by the ordered list just prior to the intermediate server;
   computing the EC scalar product of a local private key and Z as well as each of the elements of the received set of previous one-way function results, yielding a first set of next one-way function results;
   sending the ordered list and the first set of next one-way function results to a next server identified by the ordered list just subsequent to the intermediate server;
   after sending the ordered list and the first set of next one-way function results to the next server, receiving a second set of previous one-way function results from the previous server;
   computing the EC scalar product of a local private key and a last element of the received second set of previous one-way function results, yielding the shared secret;
   deriving the encryption key from the shared secret;
   computing the EC scalar product of the local private key and each of the elements, excluding the last element, of the received second set of previous one-way function results, yielding a second set of next one-way function results;
   sending the second set of next one-way function results to the next server; and
   performing additional secured communication with the first server across the network using the encryption key for encrypting the additional secured communication.

6. The method of claim 4 wherein the method further includes, at the last server of the set of servers:
   in response to receiving the broadcast signal from the first server, sending the identifying information of the last server to the first server;
   receiving the ordered list and a set of previous one-way function results from a previous server identified by the ordered list just prior to the last server;
   computing the EC scalar product of f and a last element of the received set of previous one-way function results, yielding the shared secret;
   deriving the encryption key from the shared secret;
   computing the EC scalar product of f and Z to yield the last public key;
   computing the EC scalar product of f and each of the elements, excluding the last element, of the received set of previous one-way function results, yielding the set of intermediate one-way function results;
   sending the set of one-way function results to the first server; and performing additional secured communication with the first server across the network using the encryption key for encrypting the additional secured communication.

7. The method of claim 3 wherein:
the method further includes randomly generating a point on the specific EC to use as Z; and
sending the ordered list and A to the second server includes sending Z to the second server.

8. The method of claim 1 wherein creating the ordered list of the identifying information includes:
placing the identifying information of the first server at the beginning of the ordered list; and
placing the received identifying information from all servers of the set of servers, excluding the first server, at the end of the ordered list as the received identifying information is received.

9. The method of claim 1 wherein creating the ordered list of the identifying information includes:
placing the identifying information of the first server at the beginning of the ordered list; and
placing the received identifying information from all servers of the set of servers, excluding the first server, at the end of the ordered list in the order that the received identifying information was sent by the set of servers.

10. The method of claim 1 wherein creating the ordered list of the identifying information includes:
placing the identifying information of the first server at the beginning of the ordered list; and
placing the received identifying information from all servers of the set of servers, excluding the first server, at the end of the ordered list in random order.

11. A computer program product, comprising a tangible non-transitory computer-readable storage medium storing a set of instructions, which, when performed by a server computer, cause the server computer to perform the following operations:
computing a one-way function of a private key, a, uniquely associated with the server computer, and a base element, Z, yielding a first public key, A, uniquely associated with the server computer, as the result of this one-way function computation;
broadcasting a signal to a network, the signal requesting all servers of a set of servers on the network, excluding the server computer, to respond with identifying information, the set of servers including at least three servers;
receiving the identifying information from all servers of the set of servers, excluding the first server;
creating an ordered list of the identifying information of the set of servers, identifying information of the server computer being at the beginning of the ordered list;
sending the ordered list and A to a second server of the set of servers, the second server being a server identified by the identifying information immediately following the server computer's identifying information on the ordered list;
receiving, from a last server identified by the last identifying information of the ordered list, a set of one-way function results calculated by the last server based on information received from servers of the set of servers;
computing the one-way function of a and a last one-way function result of the received set of one-way function results, yielding a shared secret; and
deriving an encryption key from the shared secret.

12. The computer program product of claim 11 wherein:
the set of one-way function results includes:
a last public key, F, uniquely associated with the last server, F having been computed by the last server by applying the one-way function to a last private key, f, uniquely associated with the last server, and Z; and
a set of intermediate one-way function results calculated by the last server based on information received from servers of the set of servers, excluding the server computer and the last server; and
the set of instructions, when performed by the server computer, further cause the server computer to perform the following operations:
computing the one-way function of a and F as well as each of the intermediate one-way function results, excluding the last one-way function result, yielding a set of new one-way function results;
sending the set of new one-way function results to the second server; and
performing secured communication with another server of the set of servers across the network using the encryption key for encrypting the secured communication.

13. The computer program product of claim 12 wherein:
the one-way function is the elliptic curve (EC) scalar product of a scalar value and a point on a specific EC;
the private keys, a and f, are scalar values;
Z is a base point on the specific EC; and
the public keys, A and F, are points on the specific EC.

14. The computer program product of claim 13 wherein the last one-way function result is the EC scalar product of the product of a private key of each of the servers of the set of servers, excluding the server computer and the last server, multiplied together and Z.

15. The computer program product of claim 13 wherein:
the set of instructions, when performed by the server computer, further cause the server computer to perform the operation of randomly generating a point on the specific EC to use as Z; and
the set of instructions, when performed by the server computer to send the ordered list and A to the second server, cause the server computer to send Z to the second server.

16. The computer program product of claim 11 wherein the set of instructions, when performed by the server computer to create the ordered list of the identifying information, cause the server computer to:
place the identifying information of the server computer at the beginning of the ordered list; and
place the received identifying information from all servers of the set of servers, excluding the server computer, at the end of the ordered list as the received identifying information is received.

17. The computer program product of claim 11 wherein the set of instructions, when performed by the server computer to create the ordered list of the identifying information, cause the server computer to:
place the identifying information of the server computer at the beginning of the ordered list; and
place the received identifying information from all servers of the set of servers, excluding the server computer, at the end of the ordered list in the order that the received identifying information was sent by the set of servers.

18. A system for securely establishing a shared encryption key, the system comprising:
a network;
a set of at least three servers connected to the network, wherein:
a first server of the set of servers is a computer including:
a first network interface for connecting to the network;
a first controller; and first memory, the first memory storing a set of instructions, which, when performed by a the first server, cause the first server to perform the following operations:
- computing a one-way function of a private key, a, uniquely associated with the first server, and a base element, Z, yielding a first public key, A, uniquely associated with the first server, as the result of this one-way function computation;
- broadcasting a signal to the network over the first network interface, the signal requesting all servers of the set of servers, excluding the first server, to respond with identifying information;
- receiving, over the first network interface, the identifying information from all servers of the set of servers, excluding the first server;
- creating an ordered list of the identifying information of the set of servers, identifying information of the first server being at the beginning of the ordered list;
- sending, over the first network interface, the ordered list and A to a second server of the set of servers, the second server being a server identified by the identifying information immediately following the first server's identifying information on the ordered list;
- receiving, over the first network interface, from a last server identified by the last identifying information of the ordered list, a set of one-way function results calculated by the last server based on information received from servers of the set of servers, the set of one-way function results including:
  - a last public key, F, uniquely associated with the last server, F having been computed by the last server by applying the one-way function to a last private key, f, uniquely associated with the last server, and Z; and
  - a set of intermediate one-way function results calculated by the last server based on information received from servers of the set of servers, excluding the first server and the last server;
- computing the one-way function of a and a last one-way function result of the received set of one-way function results, yielding a shared secret;
- deriving the encryption key from the shared secret;
- computing the one-way function of a and F as well as each of the intermediate one-way function results, excluding the last one-way function result, yielding a set of new one-way function results;
- sending the set of new one-way function results to the second server; and
- performing secured communication with another server of the set of servers across the first network interface using the encryption key for encrypting the secured communication; and a second server, the second server being a computer including:
- a second network interface for connecting to the network;
- a second controller; and
- second memory, the second memory storing a set of instructions, which, when performed by a the second server, cause the second server to perform the following operations:
  - in response to receiving the broadcast signal from the first server, sending the identifying information of that intermediate server to the first server;
  - receiving the ordered list and A from the first server;
  - computing the one-way function of a local private key and Z as well as A, yielding a first set of next one-way function results;
  - sending the ordered list and the first set of next one-way function results to a next server identified by the ordered list just subsequent to the second server;
  - after sending the ordered list and the first set of next one-way function results to the next server, receiving the set of new one-way function results from the first server;
  - computing the one-way function of a local private key and a last element of the received set of new one-way function results, yielding the shared secret;
  - deriving the encryption key from the shared secret;
  - computing the one-way function of the local private key and each of the elements, excluding the last element, of the received set of new one-way function results, yielding a second set of next one-way function results;
  - sending the second set of next one-way function results to the next server; and
  - performing the secured communication with the first server across the second network interface using the encryption key for encrypting the secured communication.

19. The system of claim 18 wherein:
the one-way function is the elliptic curve (EC) scalar product of a scalar value and a point on a specific EC;
the private keys, a and f, are scalar values;
Z is a base point on the specific EC; and
the public keys, A and F, are points on the specific EC.

20. The system of claim 19 wherein the last one-way function result is the EC scalar product of the product of a private key of each of the servers of the set of servers, excluding the first server and the last server, multiplied together and Z.

* * * * *